US006937013B2

(12) United States Patent
Ganesan (10) Patent No.: US 6,937,013 B2
(45) Date of Patent: Aug. 30, 2005

(54) NMR TOOL FOR MAKING FORMATION EVALUATION MEASUREMENTS USING GRADIENT ECHOES

(75) Inventor: Krishnamurthy Ganesan, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 41 days.

(21) Appl. No.: 10/175,287

(22) Filed: Jun. 19, 2002

(65) Prior Publication Data

US 2003/0234648 A1 Dec. 25, 2003

(51) Int. Cl.$^7$ .................................................. G01V 3/00
(52) U.S. Cl. ...................................................... 324/303
(58) Field of Search .................... 324/303, 307, 324/309

(56) References Cited

U.S. PATENT DOCUMENTS

| | | | |
|---|---|---|---|
| 4,350,955 A | | 9/1982 | Jackson et al. |
| 4,717,877 A | | 1/1988 | Taicher et al. |
| 5,428,291 A | * | 6/1995 | Thomann et al. ........... 324/303 |
| 5,565,775 A | * | 10/1996 | Stallmach et al. .......... 324/303 |
| 5,629,623 A | | 5/1997 | Sezginer et al. |
| 5,796,252 A | * | 8/1998 | Kleinberg et al. .......... 324/303 |
| 5,914,598 A | | 6/1999 | Sezginer et al. |
| 6,111,408 A | * | 8/2000 | Blades et al. ................ 324/303 |
| 6,133,735 A | * | 10/2000 | Hurlimann et al. ......... 324/303 |
| 6,166,543 A | * | 12/2000 | Sezginer et al. ............. 324/303 |
| 6,232,778 B1 | | 5/2001 | Speier et al. |
| 6,237,404 B1 | | 5/2001 | Crary et al. |
| 6,246,236 B1 | | 6/2001 | Poitzsch et al. |
| 6,255,817 B1 | | 7/2001 | Poitzsch et al. |
| 6,291,995 B1 | | 9/2001 | Speier et al. |
| 6,297,632 B1 | | 10/2001 | Speier |
| 6,326,784 B1 | * | 12/2001 | Ganesan et al. ............. 324/303 |
| 6,366,089 B1 | | 4/2002 | Poitzsch et al. |
| 6,373,248 B1 | | 4/2002 | Poitzsch et al. |
| 6,392,410 B2 | | 5/2002 | Luong et al. |
| 6,400,149 B1 | | 6/2002 | Luong et al. |
| 6,492,809 B1 | | 12/2002 | Speier et al. |
| 6,518,757 B1 | * | 2/2003 | Speier ........................ 324/303 |
| 6,518,758 B1 | | 2/2003 | Speier et al. |
| 6,522,136 B1 | * | 2/2003 | Hurlimann et al. ......... 324/303 |
| 6,522,137 B1 | * | 2/2003 | Sun et al. .................... 324/303 |
| 6,528,995 B1 | | 3/2003 | Speier et al. |
| 6,531,869 B1 | | 3/2003 | Speier et al. |
| 6,538,438 B1 | | 3/2003 | Speier et al. |
| 6,566,874 B1 | | 5/2003 | Speier et al. |
| 6,570,381 B1 | | 5/2003 | Speier et al. |
| 6,577,125 B2 | * | 6/2003 | Prammer et al. ........... 324/303 |

OTHER PUBLICATIONS

Cutillo, Antonio G., Application of Magnetic Resonance to the Study of Lung, Futura Publishing Company, Inc. 1996, pp. 560 & 589.
Callaghan, Paul T., Principles of Nuclear Magnetic Resonance Microscopy, Oxford Science Publications, 1991, pp. 133–138.

* cited by examiner

Primary Examiner—Louis Arana
Assistant Examiner—Dixomara Vargas
(74) Attorney, Agent, or Firm—Kevin P. McEnaney; Brigitte L. Echols (57) ABSTRACT

The invention is related methods for nuclear magnetic resonance measurements; the methods include the steps of applying a first static magnetic field to polarize the sample; radiating a radio frequency pulse onto the sample. Subsequently, applying a second magnetic field such that when combined with the first static magnetic field; a third static magnetic field is produced. Finally, during the application of the second static magnetic field or after removing it, the NMR signal emitted by the sample is measured. Finally, the methods can be used for making nuclear magnetic resonance measurements in wells.

82 Claims, 8 Drawing Sheets

PRIOR ART

NMR TOOL FOR MAKING FORMATION EVALUATION MEASUREMENTS USING GRADIENT ECHOES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

The invention relates generally to methods and apparatus for nuclear magnetic resonance (NMR) spectroscopy.

2. Background Art

Electromagnetic based instruments for measuring properties of matter or identifying its composition are well known. The nuclear magnetic resonance (NMR) technique has been used to form images of biological tissues or to determine the composition of, for example, earth formations.

Apparatus for nuclear magnetic resonance measurements are well known in the art. Generally, apparatus for nuclear magnetic resonance measurements include magnets to form a static magnetic field and antennas for transmitting and receiving radio frequency magnetic fields. The antennas usually are solenoid coils located close to the region to be analyzed. Example of NMR are disclosed in U.S. Pat. No. 4,350,955 issued to Jackson et al. and U.S. Pat. No. 4,717,877 issued to Taicher et al.

The nuclear magnetic resonance phenomenon is exhibited by atomic nuclei with an odd total number of protons and neutrons. When placed in an externally applied static magnetic field, $B_o$, the atomic nuclei tend to align themselves with the applied field and produce a net magnetization, M, in the direction of the applied field. The nuclei precess about the axis of the applied field with a characteristic NMR frequency ω (called the Larmor frequency) given by the equation:

$$\omega = \gamma B_o \quad (1)$$

where γ is the gyromagnetic ratio.

A time-dependent (RF) magnetic field, having frequency components equal to the atomic nuclei's specific Larmor frequency, and that is applied in a direction orthogonal to the static magnetic field $B_o$, will make the nuclei absorb energy and nutate away from the axis of the static magnetic field $B_o$. If the RF pulse is turned off precisely when the angle of nutation reaches 90°, the magnetization falls into a plane transverse to the direction of $B_o$ (the x-y plane) and the net magnetization now precesses about the static magnetic field $B_o$ in the transverse plane at the Larmor frequency. Such a pulse is called a 90° pulse. A 180° pulse is one which nutates the magnetization through 180°, inverting it. These two types of RF pulse form the basic tools of NMR spectroscopy.

Figure 2A:
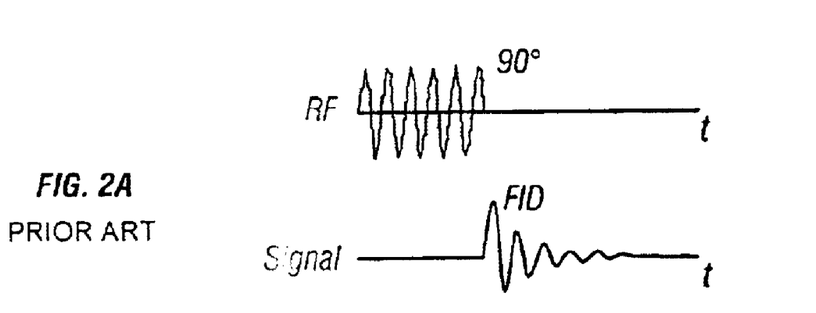
FIGS. 2a and 2b are illustrations of applied and measured signals.
Figure 2B:
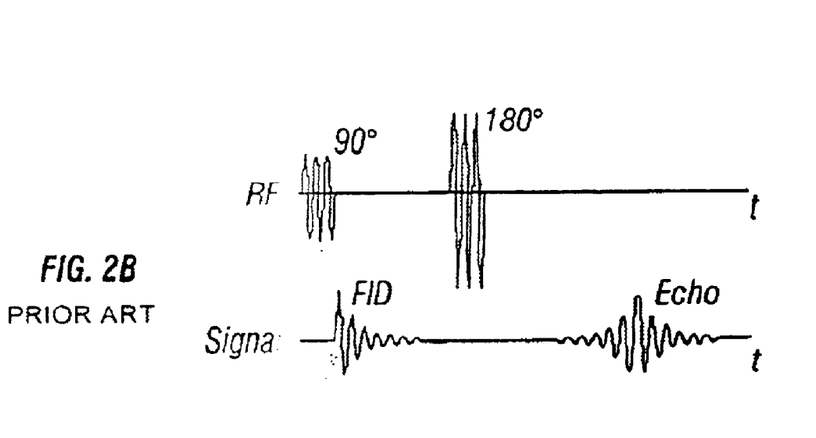

FIGS. 2a and 2b show pulse sequences typically used in NMR spectroscopy. FIG. 2a shows the above described 90° pulse on the upper graph, and a detected signal on the lower graph. FIG. 2b shows the spin-echo pulse sequence. A 90° pulse is first applied to the atomic nuclei system. The 90° degree pulse rotates the corresponding magnetization into the x-y plane. The transverse magnetization begins to dephase. At some point in time after the 90° pulse, a 180° pulse is applied. This pulse rotates the magnetization by 180° about the x axis. The 180° pulse causes the magnetization to at least partially rephase forming a signal called an echo. Therefore, the 180° is referred to as refocusing pulse. The lower graph in FIG. 2b shows the detected signal.

Not only 90° pulses are used. Repeating several small flip angles (<90°) RF pulses are also useful in order to produce high signal to noise ratios (S/N). The advantage of using small flip angle RF pulse is that after the RF pulse there are still remains of magnetization along the z axis. The remaining magnetization can be used for the observation of the next NMR signal. Therefore, one can repeat the application of another small flip angle RF pulse without having to wait for the return of magnetization along the z axis. The time constant with which the magnetization returns to the Z axis after the RF pulse is called the spin-lattice relaxation time ($T_1$). The application of small flip angle RF pulse permits the repetition of subsequent RF pulses without the magnetization vector having reached its equilibrium value. For a fixed time, it is possible to acquire a series of NMR signals with small flip angle and small repetition times instead of a single 90° RF pulse. Therefore, the signal to noise ratio (S/N) is greater using a series of small flip angles than when using a single 90° RF pulse.

The optimum small flip angle α and the small flip angles pulse spacing τ are related to the relaxation time $T_1$ by the relationship:

$$\cos \alpha = \exp(-\tau/T_1).$$

Figure 9:
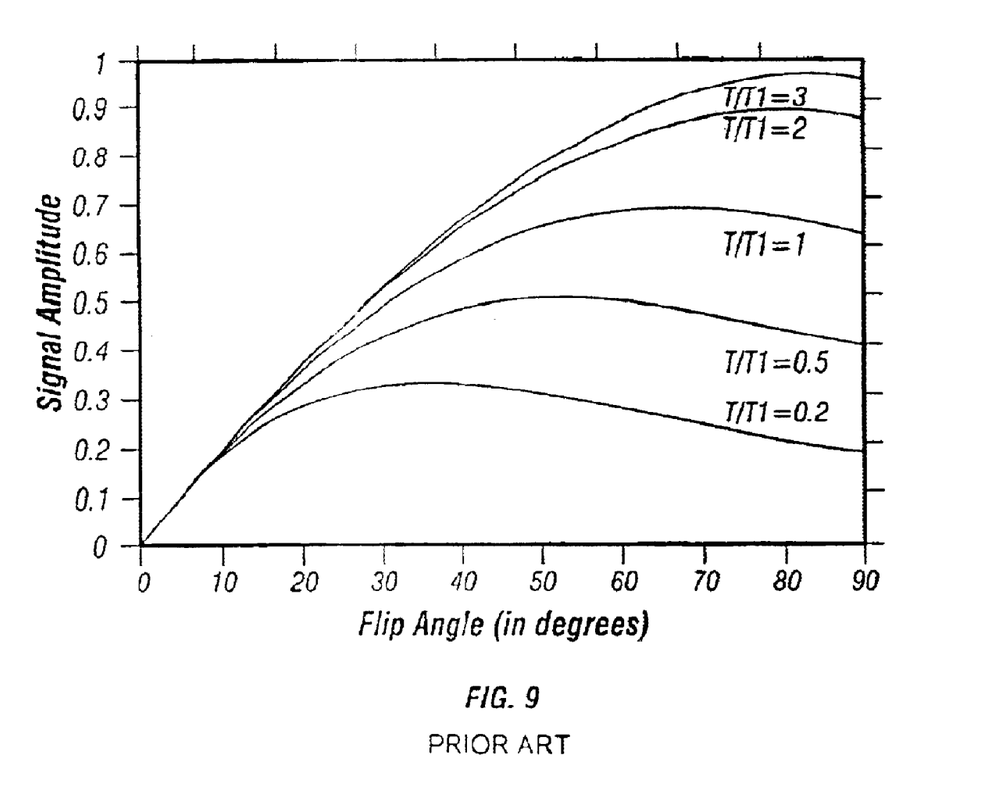
FIG. 9 shows a plot of the normalized peak FID amplitude as a function of flip angle (β) for various values of $T/T_1$.

It is known that the observed NMR signal strength depends on the flip angle, repetition time, and $T_1$. The initial amplitude of the FID signal is given by:

$$M = M_o[(1-E_1)/(1-E1 \cos \beta)] \sin \beta$$

where $E_1 = \exp(-T/T_1)$
$T_1$ = spin-lattice relaxation time
T = repetition time
β = flip angle FIG. 9 shows a plot of the normalized peak FID amplitude as a function of flip angle (β) for various values of $T/T_1$.

For example, the signal amplitude is 50% of full amplitude with 50° flip angle when the repetition time is 50% of $T_1$. The FID signal amplitude for maximum signal is with 90° flip angle with the re[etition time of $5T_1$. Within a time of $5T_1$, the 50° flip angle can be repeated 10 times and the increase in S/N is 58%.

Experimentally, the NMR signal is detected by a tuned RF coil with its axis perpendicular to the static magnetic field $B_o$. The same coil used for excitation is also suitable for detection, or alternatively, a separate, mutually orthogonal coil can be used. The oscillating NMR magnetization induces a voltage in the coil. These NMR signals may be detected and Fourier-transformed to derive the frequency components of the NMR signals characteristic of the excited nuclei.

The decay in the signal amplitude over time is due to spin-spin relaxation phenomena and the fact that each atomic nucleus experiences a slightly different magnetic field. At the signal's maximum value all atomic nuclei precess in unison. As time elapses, the greater will be the phase differences between atomic nuclei and the total contribution of the magnetization vectors of each atomic nucleus will inevitably sum to zero.

The atomic nuclei experience different magnetic field values with respect to each other generally due to inhomogeneities in the static magnetic field $B_o$, the chemical shift phenomenon, or due to internal (sample-induced) magnetic field inhomogeneity.

Figure 3:
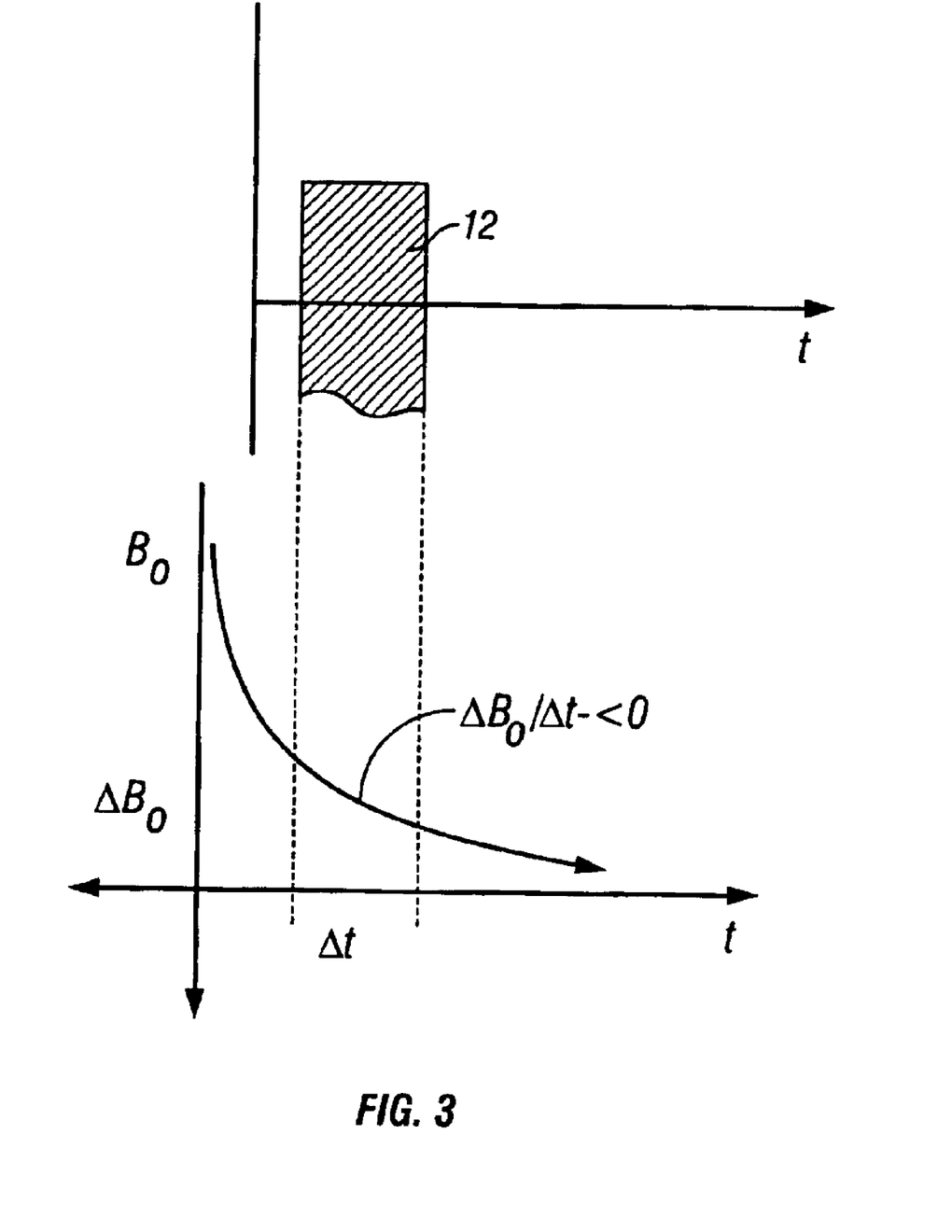
FIG. 3 is a diagram of the applied static magnetic field's value.

The static magnetic field $B_o$ inhomogeneities can be due to imperfections in the corresponding magnetic field source. Also, the strength of the static magnetic field $B_o$ experiences a fall-off the further it is measured from the static magnetic field source, as shown in FIG. 3. This is called the gradient of the magnetic field. The gradient has a slope defined by the amount of change of the magnetic field strength divided by the displacement from the magnetic field source. A gradient such that the magnetic field strength decreases the further it is measured from the magnetic field source is defined as having a negative slope (dB/dx<0). Magnetic fields whose strength increases the further it is measured from the magnetic field source are defined as having gradients with positive slopes (dB/dx>0).

The chemical shift phenomenon occurs when an atom is placed in a magnetic field. The electrons of the atom circulate about the direction of the applied magnetic field causing a magnetic field at the nucleus which will contribute to the total value of the magnetic field applied to the nucleus of the atom.

Examples of internal (sample-induced) magnetic field inhomogeneities are interfaces between media having different magnetic susceptibilities, such as grain-pore fluid interface in earth formations.

The measurable signal (Free induction decay, FID) lasts only as long as the atomic nuclei precess in unison. The time period in which the signal decays to zero is referred to as free induction decay time.

It has been noted that the signal decays exponentially with respect to time, therefore:

$$M(t)=M_o e^{(-t/T_2^*)} \quad (1)$$

where $M_o$ is the modulus of the initial magnetization vector and $T_2^*$ is called the time decay constant and it is the time required to reduce $M_o$ by a factor of e. The inverse of $T_2^*$ ($1/T_2^*$) is the rate at which $M_o$'s value reduces in a specific time period t.

As previously described, the decay of the signal amplitude can be due to the inhomogeneities of the net magnetic field applied on the excited region. These inhomogeneities can be product of the gradient of the static magnetic field, chemical shift and sample induced inhomogeneities. Each of the above mentioned phenomena will contribute its own specific rate to reduce the net magnetization vector. Therefore, $$1/T_2^* = 1/T_2 + 1/T_2' + \gamma \Delta B o$$

Where, for example, $1/T_2$ is due to spin-spin relaxation, $1/T_2'$ is the sample induced inhomogeneities' rate and $\gamma \Delta B_o$ corresponds to the static field inhomogeneity contribution. Equation 1 can be rewritten as:

$$M(t)=M_o [e^{-t(T_2+T_2'+\gamma \Delta Bo)}] \quad (2)$$

Therefore, the (FID) decay time following the 90° RF pulse can result from the magnetic field inhomogeneity of the static field $B_o$, spin-spin relaxation time ($T_2$) and the sample induced inhomogeneities' time ($T_2'$) as shown in equation 2.

The NMR signal will be emitted from a region located in the sample being irradiated by the RF signal. This region is called the excited region. FIG. 3 shows exited region (12) having a thickness $\Delta x$. It is known that the stronger the RF signal is, the greater will be the value of $\Delta x$. A greater $\Delta x$ will imply a greater drop in the static magnetic field's value across the excited region which implies a greater inhomogeneity in the static magnetic field ($\Delta B_o$) and an inevitable faster decay of the signal as can be seen in equation 2. Therefore, as the strength of the RF field is increased, the duration of the signal will decrease substantially.

However, thicker (greater $\Delta x$) excited regions will result, for example, in higher detectable signals, such as CPMG sequence (Carll-Purcell-Meiboom-Gill) echo signals. The CPMG sequence consists of a 90° pulse followed by a number of 180° pulses between which echoes occur.

Therefore, it is desirable to be able to modify or even cancel out, while undertaking NMR measurements, a specific contribution for the FID decay time, such as, for example, the magnetic field inhomogeneity of the static magnetic field $B_o$.

Moreover, it is desirable to also modify the gradient of the net static magnetic field applied to the excited region in order to induce echo signals once the original gradient of the applied static magnetic field $B_o$ is restored.

SUMMARY OF INVENTION

An aspect of the invention is a method for nuclear magnetic resonance measurements. The methods includes the steps of applying a static magnetic field to polarize nuclei in a region of interest to be analyzed. The static magnetic field having a gradient. Moreover a radio frequency magnetic field is applied to the region to reorient the nuclei therein and also a gradient magnetic field is applied to the region of interest. The gradient magnetic field having a second gradient substantially opposite in sign and equal in magnitude to the gradient of the static magnetic field. Finally, a nuclear magnetic resonance signal from the region is detected.

Another aspect of the invention is a method for nuclear magnetic resonance measurements. The method includes the steps of applying a static magnetic field to polarize nuclei in a region of interest to be analyzed. The static magnetic field having a first gradient. Moreover, a radio frequency magnetic field is applied to the region to reorient the nuclei therein and also a gradient magnetic field is applied to the region of interest. The gradient magnetic field has a second gradient substantially opposite in sign to the gradient of the static magnetic field and having a magnitude selected to invert the sign of the gradient of the static magnetic field. Finally the gradient magnetic field is removed and a nuclear magnetic resonance signal from the region is detected.

Moreover, other aspects of the invention are methods for making nuclear magnetic resonance measuring in wells.

Other aspects and advantages of the invention will be apparent from the following description and the appended claims.

DETAILED DESCRIPTION

Figure 1:
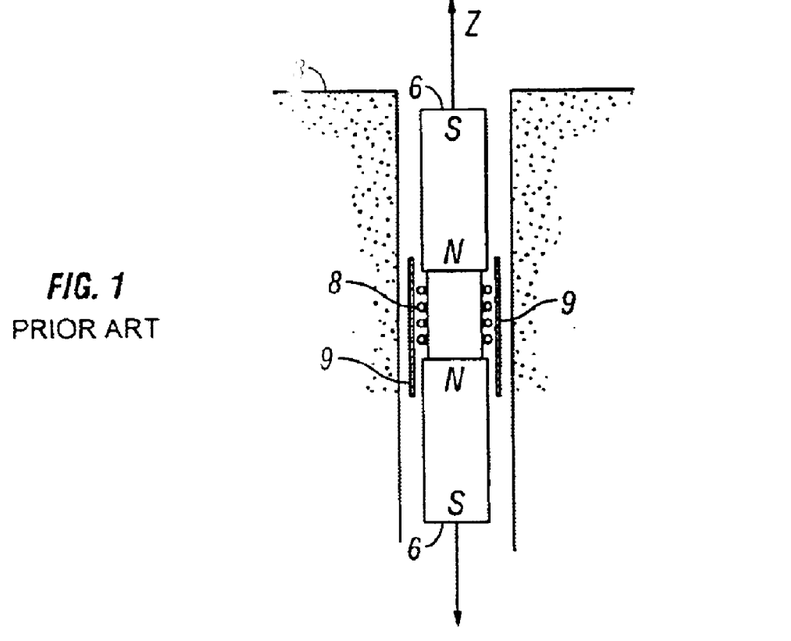
FIG. 1 is an illustration of a magnetic resonance apparatus.

The invention can be implemented, for example, through a NMR apparatus such as shown in FIG. 1.

FIG. 1 shows an apparatus for making nuclear magnetic resonance (NMR) (1) measurements close to a material (3) to be investigated. The NMR apparatus (1) can consist of a pair of magnets (6) disposed on a longitudinal axis (z). The magnets (6) have their magnetization vector parallel to the longitudinal axis z. Solenoidal coil (8) are located in the region between the magnets (6). The magnets (6) produce a static magnetic field $B_o$ which magnetic lines of induction travel from the center outward into the formation. Additionally gradient coils (9) is adapted to produce gradient magnetic field $B_g$. Coil (8) is energized with a time varying current in order to produce a radio frequency (RF) magnetic field. The induced signal produced by the atomic nuclei that compose the material (3) can be detected, for example by coil (8). Once registered, the induced signal data are transformed into a NMR spectrum. The NMR spectrum provides valuable information regarding the composition of the material (3). Apparatus for obtaining a nuclear magnetic resonance measurement, as described above, is illustrated in U.S. Pat. No 6,246,236 issued to Poitzsch et al. incorporated by reference.

According to an embodiment of the invention coil (9) can be an azimuthal gradient coil such that only selected regions can be irradiated with the gradient magnetic field in order to obtain an azimuthal imaging. For example, the corresponding signal could be detected only in front of the coil and in the remaining regions the signal can be suppressed.

Figure 4:
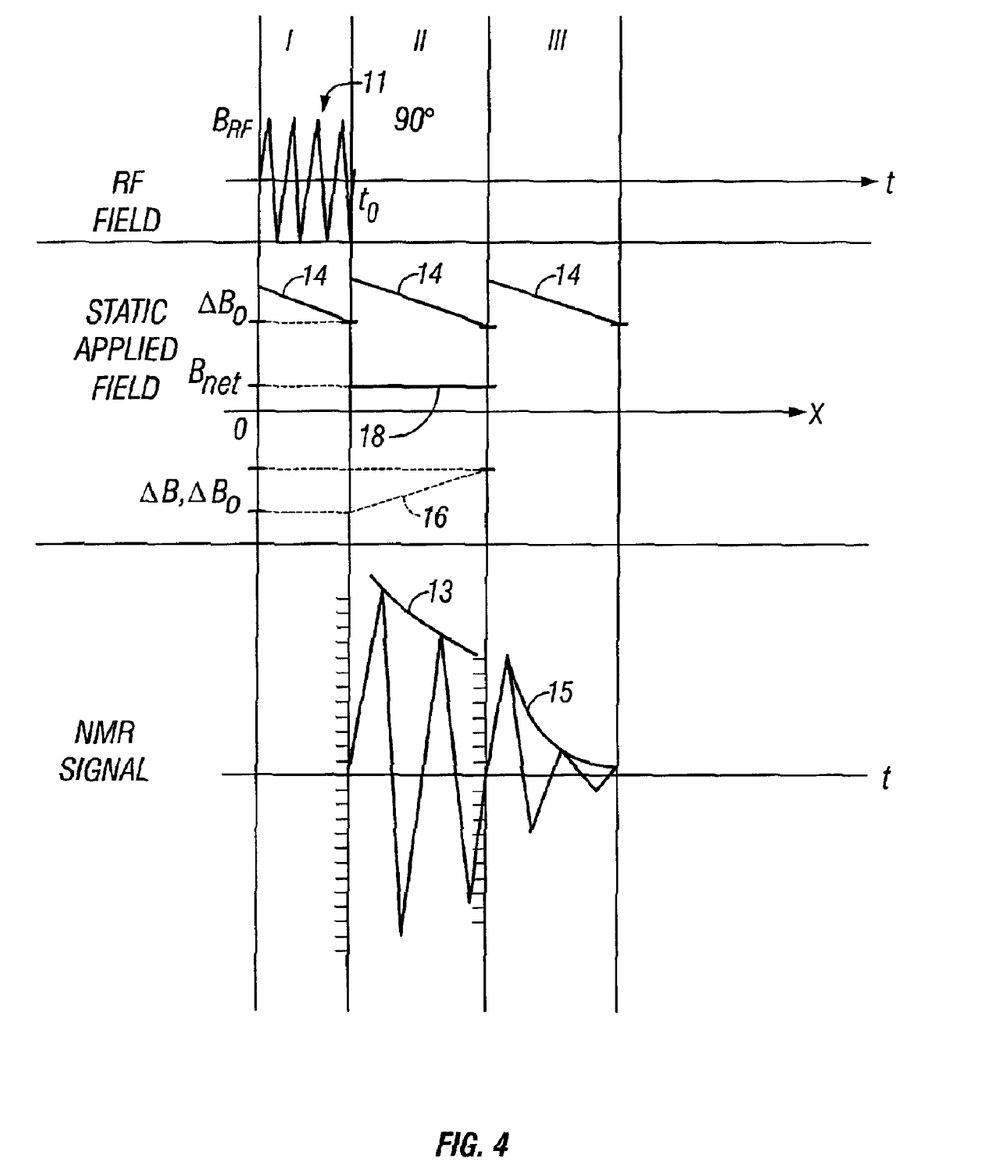
FIG. 4 is a diagram of the applied fields and measured signals according to one embodiment of the invention.

Some embodiments of the invention consist of applying a gradient magnetic field onto a sample subjected to the static magnetic field $B_o$ in order to cancel out or modify the sample's response due to the static magnetic field. Under these circumstances the FID signal (13), shown FIG. 4, is not due to the gradient of the static magnetic field $B_o$. Therefore, during the gradient magnetic field the atomic nuclei are dephasing due to other sources of magnetic field inhomogeneities, such as chemical shift, sample-induced inhomogeneities produced at, for example, the interface between media having different magnetic susceptibilities (for example, grain-pore fluid interface). As explained before, the decay times ($T_2$ and $T'_2$) for said phenomena are much longer and therefore the FID signal will last longer.

The FID signal detection has numerous applications, among them are, for example, RF pulses with lower flip angles (<90°) and small repetition times can be used to get relatively high signal to noise ratios (S/N). Also it will be possible to detect FID signals that have relatively short decay times ($T_2$). The use of azimuthally gradient coils permits the analysis of selected regions by suppressing the NMR signals in other regions. High S/N azimuthal NMR images are obtained with low flip angles and azimuthal gradient coils.

FIG. 4 is a diagram of the applied magnetic fields and measured gradient in NMR signals according to an embodiment of the invention. Rows 1 and 2 show the applied magnetic fields. Row 3 presents the induced NMR signal. Columns I to III show the different stages of the method according to an embodiment of the invention. The method shown graphically in FIG. 4 consists of initially applying, for a time $t_o$, a 90° RF magnetic field pulse (11) to a sample which is subjected to a static magnetic field (14) $B_o$ (see row 1, column 1 of FIG. 4). Subsequently, a gradient magnetic field (16) $B_g$ is applied to the sample. The value of the gradient magnetic field (16) $B_g$ is such that when combined with the static magnetic field (14) $B_o$ the net applied magnetic field (18) $B_{net}$ has a constant amplitude throughout the entire excited region (see row 2, column 2 of FIG. 4). Thus the $B_{net}$ gradient is substantially zero. Therefore, the dephasing of the atomic nuclei's precession is only due to, for example, chemical shift and/or internal (sample induced) magnetic field inhomogeneity. The emitted FID signal (13, FIG. 4) is shown in row 3, column II of FIG. 4. The atomic nuclei will be precessing with a new frequency $\gamma(B_o-B_g)$ in the presence of the gradient magnetic field $B_g$. In the absence of $B_g$, the atomic nuclei would be precessing with frequency $\gamma B_o$. Therefore, in order to detect the NMR signal during the gradient pulse, the coil (9 in FIG. 1) has to be tuned to the new frequency $\gamma(B_o-B_g)$. Column III, row 3 of FIG. 4 shows the NMR signal once the gradient magnetic field has been removed and therefore the net magnetic field applied to the excited region corresponds again only to the static magnetic field $B_o$. This is shown in column III, row 2 of FIG. 4.

The NMR spectroscopy using FID signal detection has numerous applications, among them are, for example, bulk fluid spectroscopy. Bulk fluid is any fluid which does not experience internal sample induced inhomogeneity.

More information can be obtained by comparing the obtained decay with the decay produced by CPMG signals The CPMG is characterized by spin-spin relaxation time ($T_2$), where as the FID decay is characterized by $T_2$ and also $T'_2$ (sample induced inhomogeneity). Therefore, when the FID decay is compared with the CPMG decay, the sample induced inhomogeneity information can be obtained.

Figure 5:
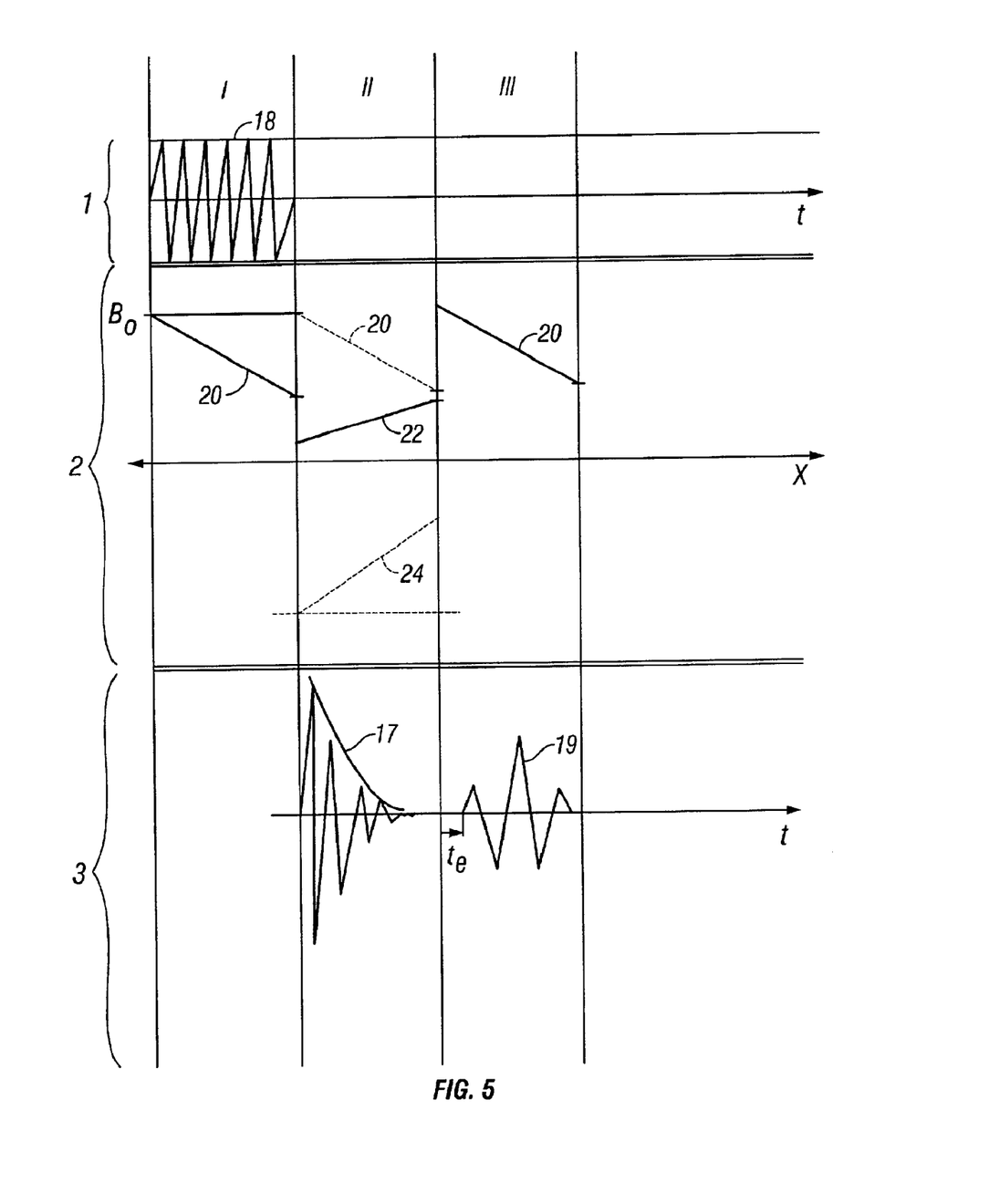
FIG. 5 is a diagram of the applied fields and measured signals according to one embodiment of the invention.

FIG. 5 is a diagram of the applied fields and measured signals according to another embodiment of the invention. Similarly as to FIG. 4, rows 1 and 2 show the applied magnetic fields. Row 3 presents the induced NMR signal. Columns I to III show the different stages of the method according to this embodiment of the invention. The method shown graphically in FIG. 5, consists of initially applying, for a time $t_o$, a 90° RF magnetic field pulse (18) to a sample which is subjected to a static magnetic field (20) $B_o$ (see row 1 and 2, column 1 of FIG. 5). Subsequently, a gradient magnetic field (24) $B_g'$ is applied to the sample. The value of the gradient magnetic field (24) $B_g'$ is such that when combined with the static magnetic field (20) $B_o$ the net applied magnetic field (22) $B_{net}'$ will have a gradient whose opposite in sign and whose absolute value is greater than the gradient of the static magnetic field (20) $B_o$. (see row 2, column II of FIG. 5). Therefore, the dephasing of the atomic nuclei's precession is in the opposite direction to that when only the static magnetic field (20) $B_o$ is applied.

Finally, the gradient magnetic field $B_g'$ is removed (see column II, row 2 of FIG. 5) forcing the atomic nuclei to rephase. Therefore, a gradient echo signal is formed.

The emitted gradient echo signal (19) is shown in FIG. 5, column III, row 3. The gradient echo signal (19) is detected when no gradient magnetic field $B_g'$ is applied. Therefore during the measurement of the gradient echo signal (19) the atomic nuclei will be precessing with frequency $\gamma B_o$. The coil (9) therefore must be tuned to a frequency equal to $\gamma B_o$.

The time ($t_e$) at which the gradient echo signal (19) is formed (see column III, row 3 of FIG. 5) is calculated from the equation:

$$t_e = |(G_o - G_g)| t_g / |G_o| \qquad (3)$$

where $G_o$ and $G_g$ are respectively, the gradient of static the field $B_o$ and gradient field $B_g$. $t_g$ is the time period during which the gradient magnetic field $B_g$ is applied. For example, when the gradient of the field $B_g$ is twice the gradient of the field $B_o$; the time at which the gradient echo signal (19) is formed $t_e$ is equal to the time period $t_g$ during which the gradient magnetic field $B_g$ is applied.

The decay of the gradient echo signal (19) will be only because of the presence the decay times due to spin-spin relaxation times (T2) and sample induced internal magnetic inhomogeneities (T'$_2$).

The gradient echo signal detection has numerous applications, among them are, for example, RF pulses with lower flip angles (<90°) can be used to get relatively high signal to noise ratios (S/N). Also it will be possible to detect FID signals that have relatively short decay times (T$_2$ and T'$_2$). The use of azimuthally gradient coils permits the analysis of selected regions by suppressing the NMR signals in other regions. High S/N azimuthal NMR images are obtained with low flip angles and azimuthal gradient coils. With respect to the FID detection the gradient echo signal provide a higher S/N.

Equation 3 is obtained by noting that the dephasing of spins in the excited region during the application of the gradient magnetic field $B_g$ is proportional to $(G_o - G_g) t_g$. The dephasing after the application of the gradient magnetic field $B_g$ is proportional to $G_o t_e$. These two dephasing values should cancel each other to refocus the signal (the echo). This is:

$$(G_o - G_g) t_g + G_o t_e = 0 \qquad (4)$$

Figure 6:
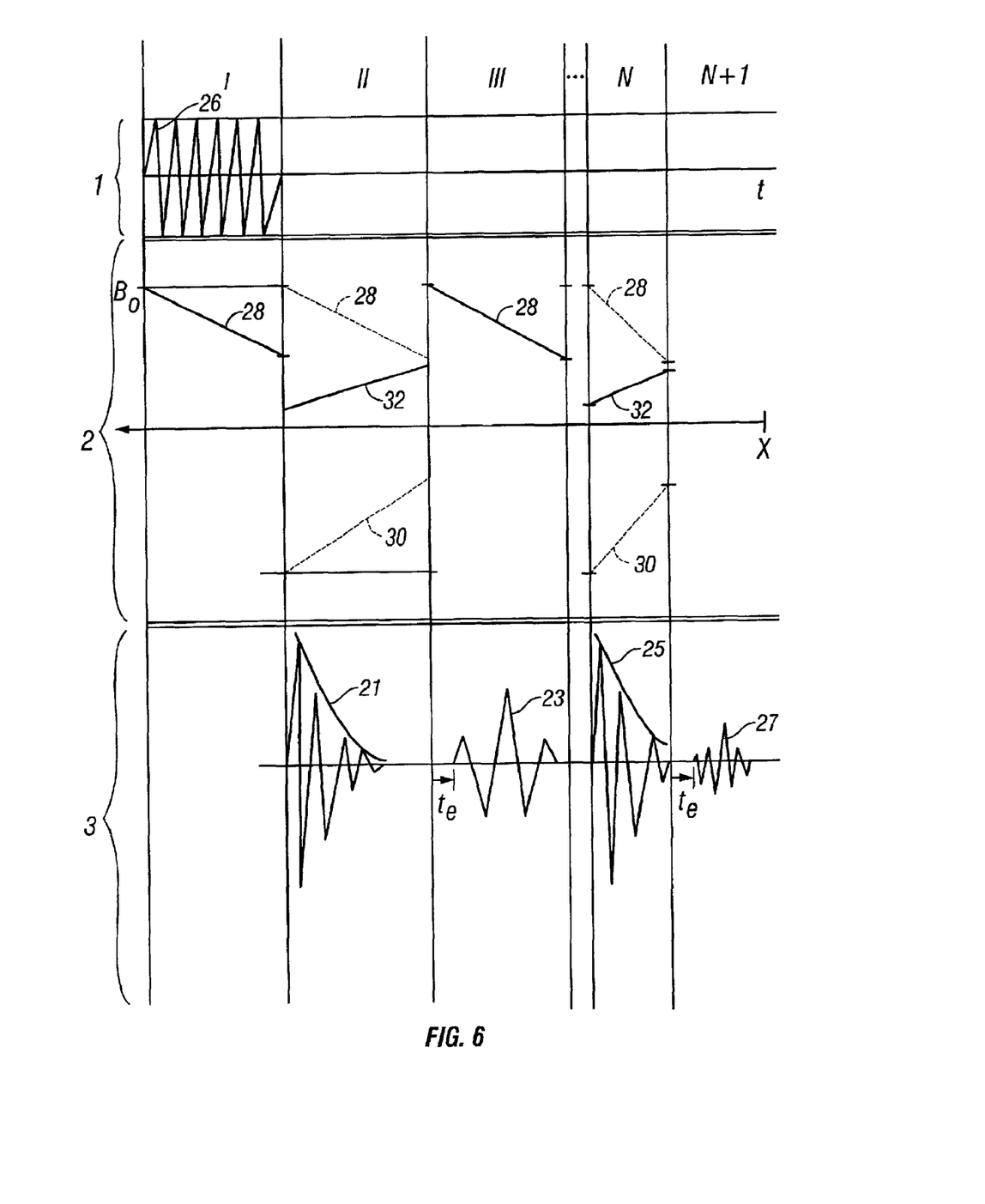
FIG. 6 is a diagram of the applied fields and measured signals according to one embodiment of the invention.

Another embodiment of the invention is shown in FIG. 6. In this case the formation of the gradient echo signal described above, is repeated for several times until the gradient echo signal (23, 27 . . . ) disappears. Initially, a RF field pulse (26) is applied (row 1, column I of FIG. 6) while the static applied magnetic field (28) $B_o$ polarizes nuclei in the region under analysis. Subsequently, a gradient magnetic field (30) $B_g'$ is applied to the region. The amplitude of the gradient magnetic field (30) $B_g$ is such that when it is combined with the static magnetic field (28) $B_o$ the gradient of the net applied magnetic field (32) $B_{net}'$ will be in an opposite direction than the gradient of the static magnetic field (28) $B_o$ (see row 2, column 2 of FIG. 6). Therefore, the dephasing of the atomic nuclei's precession is in the opposite direction to that when the static magnetic field $B_o$ is applied. This step is repeated for several times (see row 2, columns N to N+1 of FIG. 6). As can be seen, the amplitude of the emitted gradient echo signal (23, 27) will decrease until it drops to zero.

The emitted gradient echo signals (23, 27) can be used for NMR spectroscopy. Each of the emitted gradient echo signals (23, 27) is detected just before the application of the corresponding gradient magnetic field (32) $B_g'$. A Fourier transform of the detected gradient echo signals (23, 27 . . . ) can provide the NMR spectrum.

The NMR spectroscopy using gradient echo signal detection has numerous applications, among them are, for example, bulk fluid spectroscopy. Also as said before, more information can be obtained by comparing the obtained decay with the decay produced by CPMG signals and NMR spectroscopy in MDT module. With respect to the FID NMR spectroscopy detection the NMR spectroscopy using gradient echo signal detection provides a higher S/N ratio.

For example, applications where the NMR instrument is surrounded by the sample to be analyzed are suitable for the implementation of the invention. Well logging techniques are such applications.

Figure 7:
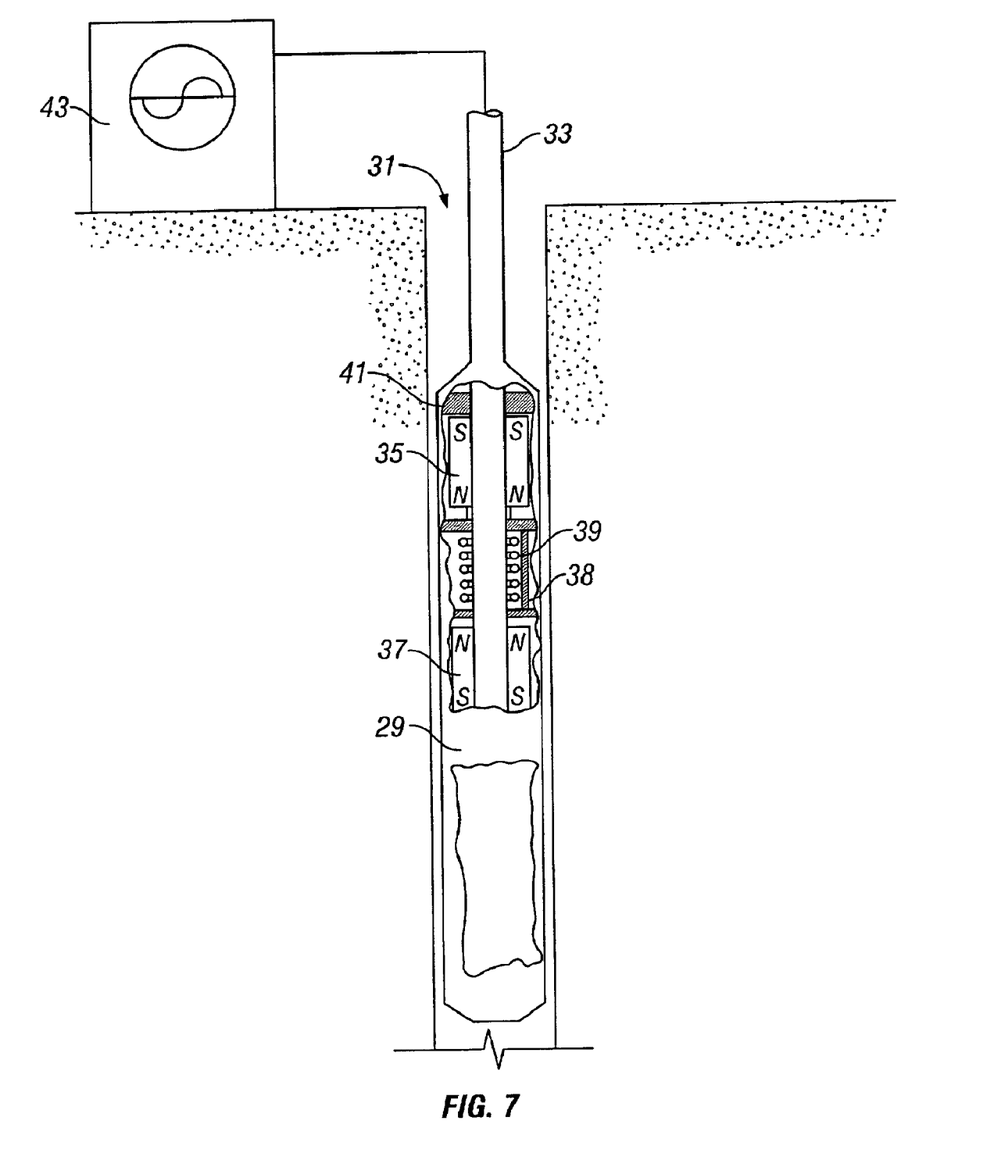
FIG. 7, is a schematic diagram of a logging tool in accordance to one embodiment of the invention.

FIG. 7 shows a logging tool (29) according to one embodiment of the invention, disposed within a well (31) on a wireline (33). The magnet arrangement as shown in FIG. 1 is located longitudinally within the logging tool. Electronic circuitry (41) delivers the corresponding electric current to the solenoid coils (38 and 39) to, respectively, produce a gradient magnetic field and emit the required RF fields in specific frequencies. Also, the electronic circuitry (41) is designed to tune the solenoid coil (39) in order to receive NMR signals emitted by the atomic nuclei forming the earth formation. Power source system (43) provides the time varying currents for energizing the coil (39) as well as detecting the NMR signals. The tool in FIG. 7 is adapted to be conveyed on a wireline (33).

Figure 8:
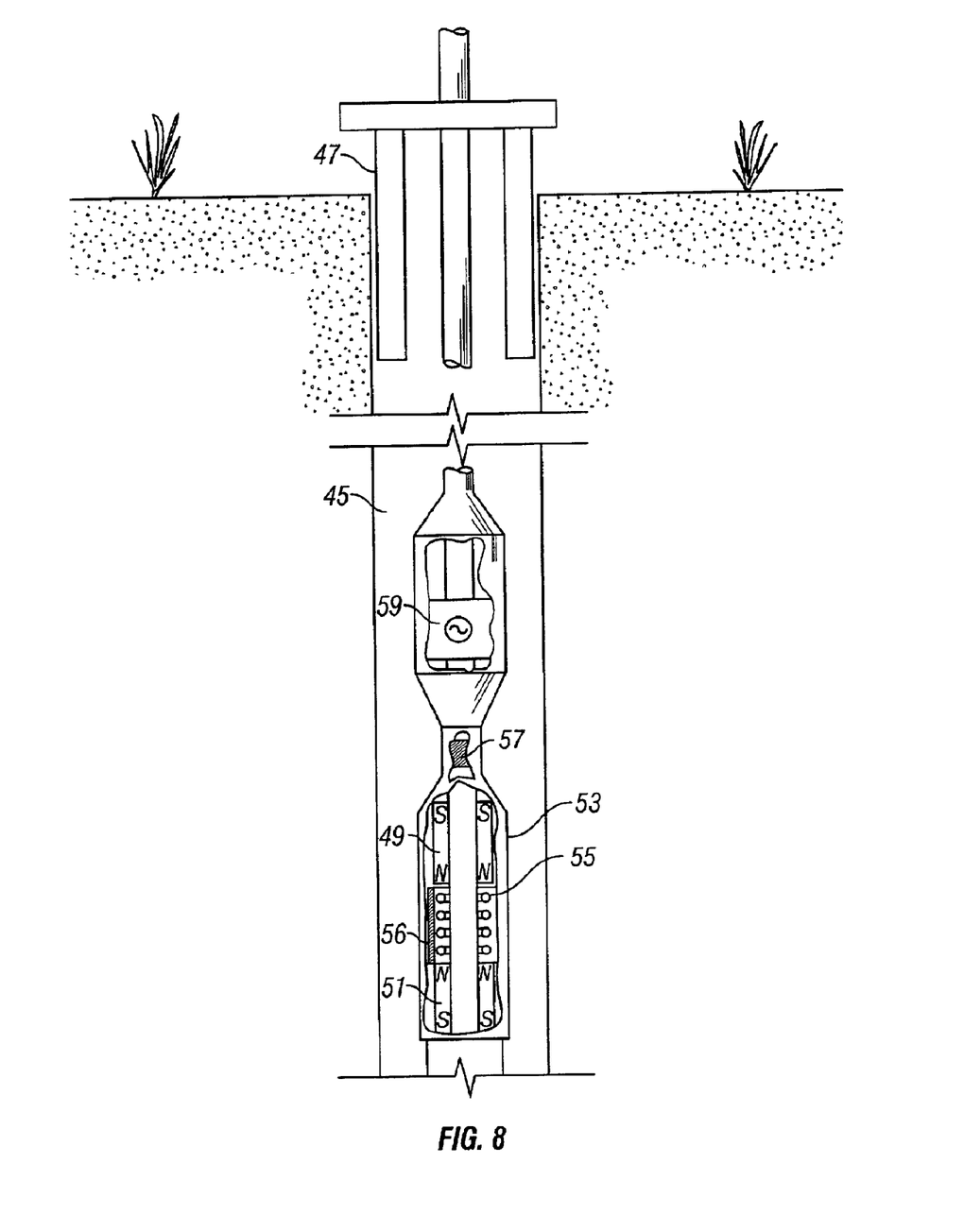
FIG. 8, is a schematic diagram of a logging tool in accordance to one embodiment of the invention.

FIG. 8 shows a drilling tool (45) according to another embodiment of the invention, disposed within a well (47). The magnet arrangement as shown in FIG. 1 is located longitudinally within the drilling tool. Electronic circuitry (57) delivers the corresponding electric current to the solenoid coils (56 and 55) to, respectively, produce a gradient magnetic field and emit the required RF fields in specific frequencies. Also, the electronic circuitry (57) is designed to tune the solenoid coil (55) in order to receive NMR signals emitted by the atomic nuclei forming the earth formation. Power source system (59) provides the time varying currents for energizing the coil (55) as well as detecting the NMR signal. Those skilled in the art will appreciate that the embodiment of FIG. 8 is a measurement while drilling (MWD) instrument.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for making nuclear magnetic resonance measurements in a well, comprising:
    applying a static magnetic field to polarize nuclei in a downhole region of interest to be analyzed, the static magnetic field having a first gradient;
    applying a radio frequency magnetic field pulse to the region to reorient the nuclei therein;
    applying a gradient magnetic field to the region of interest, the gradient magnetic field having a second gradient substantially opposite in sign and equal in magnitude to the first gradient; and
    detecting a nuclear magnetic resonance gradient echo signal generated in response to the second gradient.

2. The method according to claim 1 wherein the radio frequency magnetic field pulse is at the Larmor frequency of the nuclei in the region.

3. The method according to claim 1 wherein the radio frequency magnetic field pulse has a duration and amplitude selected to reorient the nuclei in about 90°.

4. The method according to claim 1 wherein the radio frequency magnetic field pulse has a duration and amplitude selected to reorient the nuclei in the region in about lesser than 90°.

5. The method according to claim 4 wherein the radio frequency magnetic field pulse is repeated at least once.

6. The method according to claim 5 wherein the time spacing between the radio frequency magnetic field pulses is such that high signal to noise ratio is achieved.

7. The method according to claim 1 wherein gradient magnetic field is produced by at least one azimuthal coil.

8. The method according to claim 7 wherein the azimuthal coil irradiates at least one selected region.

9. The method according to claim 8, wherein the azimuthal gradient coil irradiates multiple regions to obrani an azimuthal image of a region surrounding a borehole.

10. The method according to claim 8, wherein the azimuthal gradient coil irradiates multiple regions to obtain an azimuthal image of a region surrounding a borehole.

11. The method according to claim 8, wherein the aziniuthal gradient coil irradiates multiple regions to obtain an azimuthal image of a region surrounding a borehole.

12. The method according to claim 8, wherein the azimuthal gradient coil irradiates multiple regions to obtain an azimuthal image of a region surrounding a borehole.

13. The method according to claim 1 further comprising spectrally analyzing the nuclear magnetic resonance signal.

14. The method according to claim 1, wherein a spectral response is determined from the nuclear magnetic resonance signal.

15. The method according claim 1, wherein the gradient magnetic field is applied in the presence of the static magnetic field.

16. The method according claim 1, wherein the combination of the gradient field and the static magnetic field results in an applied field that is homogeneous.

17. The method according claim 1, further comprising the step of deriving NMR spectroscopy measurement from one or more gradient echoes.

18. The method according claim 1, wherein the gradient magnetic field is applied parallel to the static magnetic field.

19. A method for making nuclear magnetic resonance measurements in a well, comprising:
    applying a static magnetic field to polarize nuclei in a downhole region of interest to be analyzed, the static magnetic field having a first gradient;
    applying a radio frequency magnetic field to the region to reorient the nuclei therein;
    applying a gradient magnetic field to the region of interest, the gradient magnetic field having a second gradient, the second gradient substantially opposite in sign to the gradient of the first static magnetic field and having a magnitude selected to invert the sign of the gradient of the static magnetic field;
    removing the gradient magnetic field; and
    detecting a nuclear magnetic resonance gradient echo signal generated in response to the second gradient.

20. The method according to claim 19 wherein the radio frequency magnetic field is at the Larmor frequency of the nuclei in the region.

21. The method according to claim 19 wherein the radio frequency magnetic field has a duration and amplitude selected to reorient the nuclei in about 90°.

22. The method according to claim 19 wherein the radio frequency magnetic field pulse has a duration and amplitude selected to reorient the nuclei in the region in about lesser than 90°.

23. The method according to claim 22 wherein the radio frequency magnetic field pulse is repeated at least once.

24. The method according to claim 23 wherein the time spacing between the radio frequency magnetic field pulses is such that high signal to noise ratio is achieved.

25. The method according to claim 19 wherein gradient magnetic field is produced by at least one azimuthal coil.

26. The method according to claim 25 wherein the azimuthal coil irradiates at least one selected region.

27. The method according to claim 19 further comprising spectrally analyzing the nuclear magnetic resonance signal.

28. The method according to claim 19 wherein applying the gradient magnetic field; removing the gradient magnetic field and detecting a nuclear magnetic resonance signal from the region are repeated until the amplitude of the nuclear magnetic resonance signal drops to zero.

29. The method according to claim 28 wherein the radio frequency magnetic field is at the Larmor frequency of the nuclei in the region.

30. The method according to claim 28 wherein the radio frequency magnetic field has a duration and amplitude selected to reorient the nuclei in about 90°.

31. The method according to claim 28 wherein the radio frequency magnetic field pulse has a duration and amplitude selected to reorient the nuclei in the region in about lesser than 90°.

32. The method according to claim 31 wherein the radio frequency magnetic field pulse is repeated at least once.

33. The method according to claim 32 wherein the time spacing between the radio frequency magnetic field pulses is such that high signal to noise ratio is achieved.

34. The method according to claim 28 wherein gradient magnetic field is produced by at least one azimuthal coil.

35. The method according to claim 34 wherein the azimuthal coil irradiates at least one selected region.

36. The method according to claim 28 further comprising spectrally analyzing the nuclear magnetic resonance signal.

37. The method according to claim 19, wherein a spectral response is determined from the nuclear magnetic resonance signal.

38. The method according claim 19, wherein the gradient magnetic field is applied in the presence of the static magnetic field.

39. The method according claim 19, wherein the combination of the gradient field and the static magnetic field results in an applied field that is homogeneous.

40. The method according claim 19, further comprising the step of deriving NMR spectroscopy measurement from one or more gradient echoes.

41. The method according claim 19, wherein the gradient magnetic field is applied parallel to the static magnetic field.

42. A method for making nuclear magnetic resonance measurements in a well, the method comprising:
    lowering a nuclear magnetic resonance well logging apparatus into the well;
    applying a static magnetic field to polarize nuclei in a region of the well, the static magnetic field having a first gradient;
    applying a radio frequency magnetic field to the region to reorient the nuclei therein;
    applying a gradient magnetic field to the region of interest, the gradient magnetic field having a second gradient substantially opposite in sign to the first gradient; and
    detecting a nuclear magnetic resonance gradient echo signal generated in response to the second gradient.

43. The method according to claim 42 wherein the radio frequency magnetic field is at the Larmor frequency of the nuclei in the region of the well.

44. The method according to claim 42 wherein the radio frequency magnetic field has a duration and amplitude selected to reorient the nuclei in about 90°.

45. The method according to claim 42 wherein the radio frequency magnetic field pulse has a duration and amplitude selected to reorient the nuclei in the region in about lesser than 90°.

46. The method according to claim 45 wherein the radio frequency magnetic field pulse is repeated at least once.

47. The method according to claim 46 wherein the time spacing between the radio frequency magnetic field pulses is such that high signal to noise ratio is achieved.

48. The method according to claim 42 wherein gradient magnetic field is produced by at least one azimuthal coil.

49. The method according to claim 48 wherein the azimuthal coil irradiates at least one selected region.

50. The method according to claim 42 further comprising spectrally analyzing the nuclear magnetic resonance signal.

51. The method according to claim 42, wherein a spectral response is determined from the nuclear magnetic resonance signal.

52. The method according claim 42, wherein the gradient magnetic field is applied in the presence of the static magnetic field.

53. The method according claim 42, wherein the combination of the gradient field end the static magnetic field results in an applied field that is homogeneous.

54. The method according claim 42, further comprising the step of deriving NMR spectroscopy measurement from one or more gradient echoes.

55. The method according claim 42, wherein the gradient magnetic field is applied parallel to the static magnetic field.

56. A method for nuclear magnetic resonance measurements in a well, the method comprising:
    lowering a nuclear magnetic resonance well logging apparatus into the well
    applying a static magnetic field to polarize nuclei in a region of the well, the static magnetic field having a first gradient;
    applying a radio frequency magnetic field to the region to reorient the nuclei therein;
    applying a gradient magnetic field to the region of interest, the gradient magnetic field having a second gradient, the second gradient substantially opposite in sign to the gradient of the first static magnetic field and having a magnitude selected to invert the sign of the gradient of the static magnetic field;
    removing the gradient magnetic field; and
    detecting a nuclear magnetic resonance gradient echo signal generated in response to the second gradient.

57. The method according to claim 56 wherein the radio frequency magnetic field is at the Larmor frequency of the nuclei in the region of the well.

58. The method according to claim 56 wherein the radio frequency magnetic field has a duration and amplitude selected to reorient the nuclei in about 90°.

59. The method according to claim 56 wherein the radio frequency magnetic field pulse has a duration and amplitude selected to reorient the nuclei in the region in about lesser than 90°.

60. The method according to claim 59 wherein the radio frequency magnetic field pulse is repeated at least once.

61. The method according to claim 60 wherein the time spacing between the radio frequency magnetic field pulses is such that high signal to noise ratio is achieved.

62. The method according to claim 56 wherein gradient magnetic field is produced by at least one azimuthal coil.

63. The method according to claim 62 wherein the azimuthal coil irradiates at least one selected region.

64. The method according to claim 56 further comprising spectrally analyzing the nuclear magnetic resonance signal.

65. The method according to claim 56 wherein the nuclear magnetic resonance tool is lowered on a wireline.

66. The method according to claim 56 wherein the nuclear magnetic resonance measurements are made while drilling.

67. The method according to claim 56 wherein applying the gradient magnetic field; removing the gradient magnetic field and detecting a nuclear magnetic resonance signal from the region are repeated until the amplitude of the nuclear magnetic resonance signal drops to zero.

68. The method according to claim 67 wherein the radio frequency magnetic field is at the Larmor frequency of the nuclei in the region.

69. The method according to claim 67 wherein the radio frequency magnetic field has a duration and amplitude selected to reorient the nuclei in about 90°.

70. The method according to claim 67 wherein the radio frequency magnetic field pulse has a duration and amplitude selected to reorient the nuclei in the region in about lesser than 90°.

71. The method according to claim 70 wherein the radio frequency magnetic field pulse is repeated at least once.

72. The method according to claim 71 wherein the time spacing between the radio frequency magnetic field pulses is such that high signal to noise ratio is achieved.

73. The method according to claim 67 wherein gradient magnetic field is produced by at least one azimuthal coil.

74. The method according to claim 73 wherein the azimuthal coil irradiates at least one selected region.

75. The method according to claim 67 further comprising spectrally analyzing the nuclear magnetic resonance signal.

76. The method according to claim 67 wherein the nuclear magnetic resonance tool is lowered on a wireline.

77. The method according to claim 67 wherein the nuclear magnetic resonance measurements are made while drilling.

78. The method according to claim 56, wherein a spectral response is determined from the nuclear magnetic resonance signal.

79. The method according claim 56, wherein the gradient magnetic field is applied in the presence of the static magnetic field.

80. The method according claim 56, wherein the combination of the gradient field and the static magnetic field results in an applied field that is homogeneous.

81. The method according claim 56, further comprising the step of deriving NMR spectroscopy measurement from one or more gradient echoes.

82. The method according claim 56, wherein the gradient magnetic field is applied parallel to the static magnetic field.

* * * * *